US010772422B1

(12) United States Patent
Chen et al.

(10) Patent No.: US 10,772,422 B1
(45) Date of Patent: Sep. 15, 2020

(54) CONNECTING DEVICE

(71) Applicants: KING SLIDE WORKS CO., LTD., Kaohsiung (TW); KING SLIDE TECHNOLOGY CO., LTD., Kaohsiung (TW)

(72) Inventors: Ken-Ching Chen, Kaohsiung (TW); Fang-Cheng Su, Kaohsiung (TW); Ci-Bin Huang, Kaohsiung (TW); Yue-Hua Tang, Kaohsiung (TW); Chun-Chiang Wang, Kaohsiung (TW)

(73) Assignees: KING SLIDE WORKS CO., LTD., Kaohsiung (TW); KING SLIDE TECHNOLOGY CO., LTD., Kaohsiung (TW)

( * ) Notice: Subject to any disclaimer, the term of this patent is extended or adjusted under 35 U.S.C. 154(b) by 0 days.

(21) Appl. No.: 16/503,595

(22) Filed: Jul. 4, 2019

(30) Foreign Application Priority Data

Mar. 15, 2019 (TW) ............................ 108109209 A

(51) Int. Cl.
*A47B 88/90* (2017.01)
*F16B 12/26* (2006.01)

(52) U.S. Cl.
CPC ...... *A47B 88/941* (2017.01); *A47B 2088/902* (2017.01); *F16B 12/26* (2013.01)

(58) Field of Classification Search
CPC ... A47B 88/90; A47B 88/941; A47B 88/0014; A47B 2088/902; A47B 2088/0037; A47B 2210/01; A47B 2210/09; A47B 2210/092
See application file for complete search history.

(56) References Cited

U.S. PATENT DOCUMENTS

| | | | | |
|---|---|---|---|---|
| 8,998,356 B2 | 4/2015 | Gasser | | |
| 9,039,108 B2 * | 5/2015 | Feuerstein | ........... | A47B 88/427 312/334.4 |
| 10,376,053 B2 * | 8/2019 | Schallert | ................ | A47B 88/40 |
| 2012/0133259 A1 | 5/2012 | Babucke-Runte | | |
| 2014/0167586 A1 * | 6/2014 | Schallert | ................ | A47B 88/40 312/330.1 |
| 2017/0135472 A1 * | 5/2017 | Chen | .................... | A47B 88/427 |
| 2018/0206636 A1 * | 7/2018 | Held | .................... | A47B 88/956 |

FOREIGN PATENT DOCUMENTS

| | | | | |
|---|---|---|---|---|
| AT | 510724 B1 * | 6/2012 | .............. | F16B 12/46 |
| DE | 20 2009 004 982 U1 | 11/2010 | | |
| DE | 20 2017 107 475 U1 | 1/2018 | | |
| DE | 102017102643 A1 * | 8/2018 | .............. | F16B 12/38 |
| GB | 1 431 046 | 4/1976 | | |
| WO | WO-2019148221 A1 * | 8/2019 | .......... | A47B 88/941 |

* cited by examiner

*Primary Examiner* — Andrew M Roersma
(74) *Attorney, Agent, or Firm* — Winston Hsu

(57) ABSTRACT

A connecting device adapted to connect a first wall and a second wall of a furniture piece is disclosed. The connecting device includes a base portion and at least one engaging arm. The base portion is connected to the first wall of the furniture piece. The at least one engaging arm is arranged at the base portion. The at least one engaging arm is resiliently movable around a hypothetical axis. The at least one engaging arm is arranged with an engaging portion. The hypothetical axis is substantially parallel to the first wall. The second wall of the furniture piece is mountable to the engaging portion along a mounting direction via a mounting portion. The mounting direction is substantially perpendicular to the hypothetical axis.

10 Claims, 12 Drawing Sheets

20a
44b
27b
44a
22
26

40a
36a
36b
42
36a
40b
34
32
41
41
30
28
38a
38
38a
36b
31
20b

CONNECTING DEVICE

BACKGROUND OF THE INVENTION

1. Field of the Invention

The present invention relates to a connecting device, and more particularly, to a connecting device which connects two walls of a furniture piece.

2. Description of the Prior Art

As shown in the US patent with U.S. Pat. No. 8,998,356 B2, a fastening device for connecting two wall parts of a furniture piece is disclosed, and more particularly, the fastening device is for connecting a rear wall to a side wall of a drawer. In the aforesaid US patent, a wall part of the fastening device has at least one locking projection which is resiliently movable about a virtual spring axis, and the locking projection can be locked, preferably detachably locked, into a locking receiver fastened to or formed on the other wall part. The virtual spring axis of the locking projection is provided transversely, preferably substantially perpendicularly, relative to a wall of the wall part. The locking receiver is formed on the other wall part as an opening. A virtual normal of the opening is substantially parallel to the virtual spring axis of the resilient locking projection.

However, with different market demands, how to develop related products to provide more choices in the market has become an issue that cannot be ignored. Furthermore, the fastening device of the aforesaid US patent is configured to barely protrude from a plane (shown in FIG. 3a of the US patent with U.S. Pat. No. 8,998,356 B2), a corresponding wall is arranged with a combining element which is bent correspondingly to be connected to the fastening device. It is apparently that the arrangement is unfavorably for installing a solid wall (such as a wood wall), and extra accessories are required for the installation.

SUMMARY OF THE INVENTION

According to one aspect of the present invention, a connecting device adapted to connect a first wall and a second wall of a furniture piece is disclosed. The connecting device includes a base portion and at least one engaging arm. The base portion is connected to the first wall of the furniture piece. The at least one engaging arm is arranged at the base portion. The at least one engaging arm is resiliently movable around a hypothetical axis. The at least one engaging arm is arranged with an engaging portion. The hypothetical axis is substantially parallel to the first wall. The second wall of the furniture piece is mountable to the engaging portion along a mounting direction via a mounting portion. The mounting direction is substantially perpendicular to the hypothetical axis.

Preferably, at least one portion of the connecting device is made of a plastic material.

Preferably, the first wall of the furniture piece includes a first portion and a second portion opposite to the first portion, and the base portion is connected and adjacent to the second portion.

Preferably, the mounting portion is arranged and adjacent to an end portion of the second wall.

Preferably, the mounting portion is detachably mounted to the engaging portion.

Preferably, the base portion includes a surface and a space adjacent to the surface, the at least one engaging arm is arranged inside the space, and a length of the at least one engaging arm does not exceed the surface.

Preferably, the mounting portion protrudes from the end portion of the second wall, and an accommodating space is formed between the mounting portion and the end portion of the second wall to accommodate the engaging portion.

Preferably, the surface is substantially a plane.

Preferably, the connecting device further includes an auxiliary portion substantially perpendicularly connected to the base portion, wherein the auxiliary portion includes at least one fastening feature provided to be inserted by a fastening member.

Preferably, the connecting device further includes a guiding portion being a curved surface or an inclined surface, wherein when the second wall of the furniture piece has a mounting error with respect to the first wall of the furniture piece, the second wall of the furniture piece is guided and corrected by the guiding portion to facilitate the mounting portion to be mounted to the engaging portion.

According to another aspect of the present invention, a connecting device adapted to a first wall of a furniture piece is disclosed. The first wall is longitudinally arranged. The connecting device includes a base portion, at least one engaging arm and an auxiliary portion. The base portion is connected to the first wall of the furniture piece. The base portion includes a surface and a space adjacent to the surface. The at least one engaging arm is arranged inside the space of the base portion. The at least one engaging arm is substantially transversely arranged with respect to the first wall. The at least one engaging arm is arranged with an engaging portion. The auxiliary portion is substantially perpendicularly connected to the base portion, and the auxiliary portion exceeds the surface of the base portion by a predetermined distance. A second wall of the furniture piece is detachably mounted to the engaging portion via a mounting portion. The auxiliary portion includes at least one fastening feature. When the mounting portion of the second wall of the furniture piece is detached from the engaging portion, an end of another second wall of the furniture piece is capable of abutting against the surface of the base portion. The least one fastening feature is provided to be inserted by a fastening member, such that the another second wall of the furniture piece is fixed to the auxiliary portion.

Preferably, the mounting portion is a hole. When the mounting portion is mounted to the engaging portion, the engaging portion passes through the hole and is engaged at a mounting end of the hole.

Preferably, the at least one engaging arm does not exceed the surface of the base portion.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the embodiments, the phrase "substantially perpendicular" or "substantially perpendicularly" refers that a member/feature is configured to be perpendicular relative to the other member/feature. However, due to manufacturing tolerance or other factors, the member/feature is not perfectly perpendicular relative to the other member/feature. For example, an included angle between the member/feature and the other member/feature ranging from 85 degrees to 95 degrees and an included angle between the member/feature and the other member/feature ranging from 88 degrees to 92 degrees are within the scope of the present invention. The phrase "substantially parallel" refers that a member/feature is configured to be parallel relative to the other member/feature. However, due to manufacturing tolerance or other factors, the member/feature is not perfectly parallel relative to the other member/feature. For example, an included angle between the member/feature and the other member/feature less than 5 degrees and an included angle between the member/feature and the other member/feature less than 2 degrees are within the scope of the present invention. The phrase "substantially a plane" refers that a member/feature is configured to be a plane. However, due to manufacturing tolerance or other factors, the member/feature is not a perfect plane. The meaning of the phrase "substantially transversely" is similar to that of the phrase "substantially perpendicularly", and thus does not repeated herein.

Figure 1:
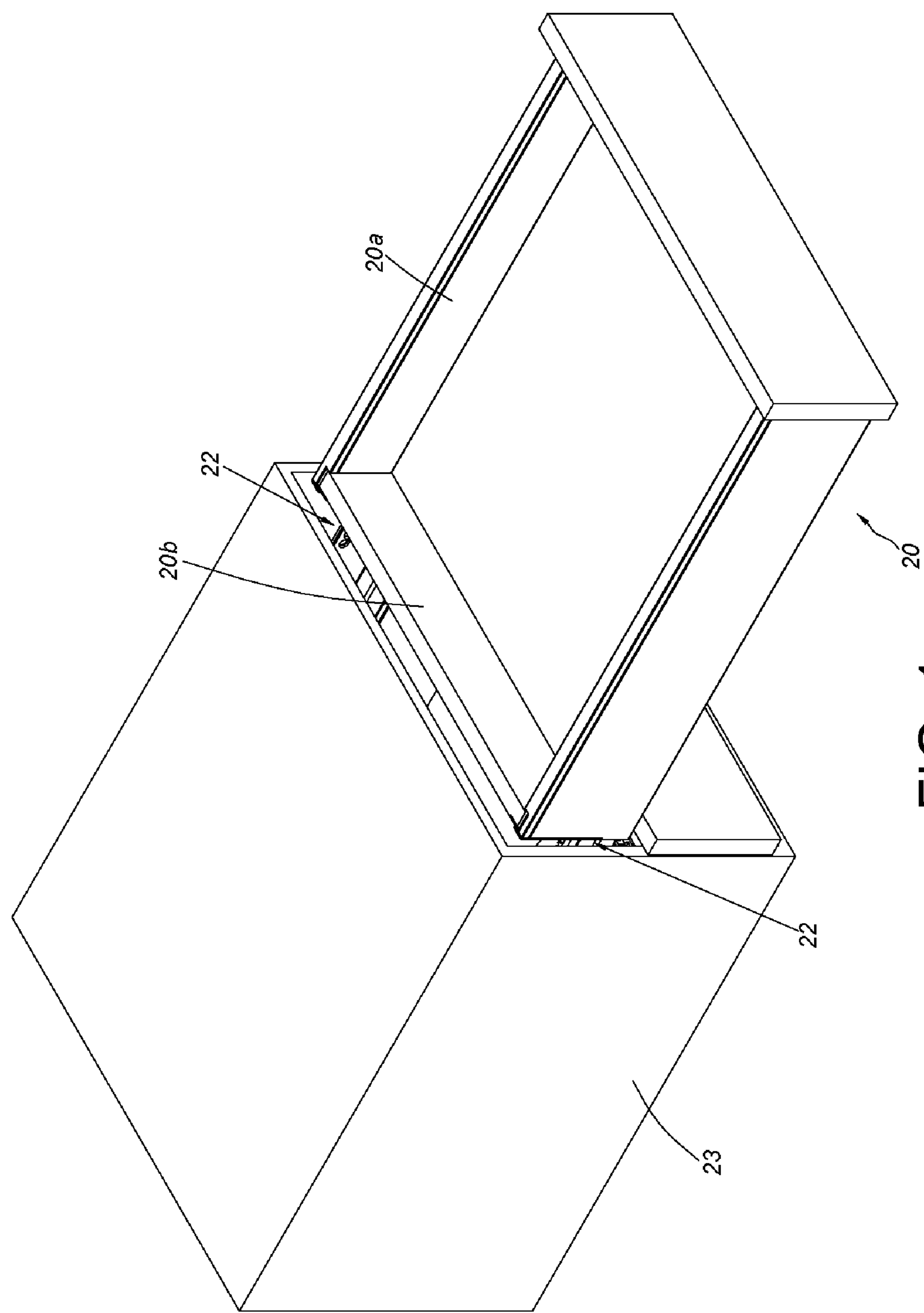
FIG. 1 is a three-dimensional diagram showing a furniture piece being mounted to a cabinet via a slide rail assembly according to an embodiment of the present invention.

As shown in FIG. 1, a furniture piece 20 can be mounted to a cabinet 23 via a pair of slide rail assemblies 22. For example, the furniture piece 20 can be a drawer, but the present invention is not limited thereto.

Figure 2:
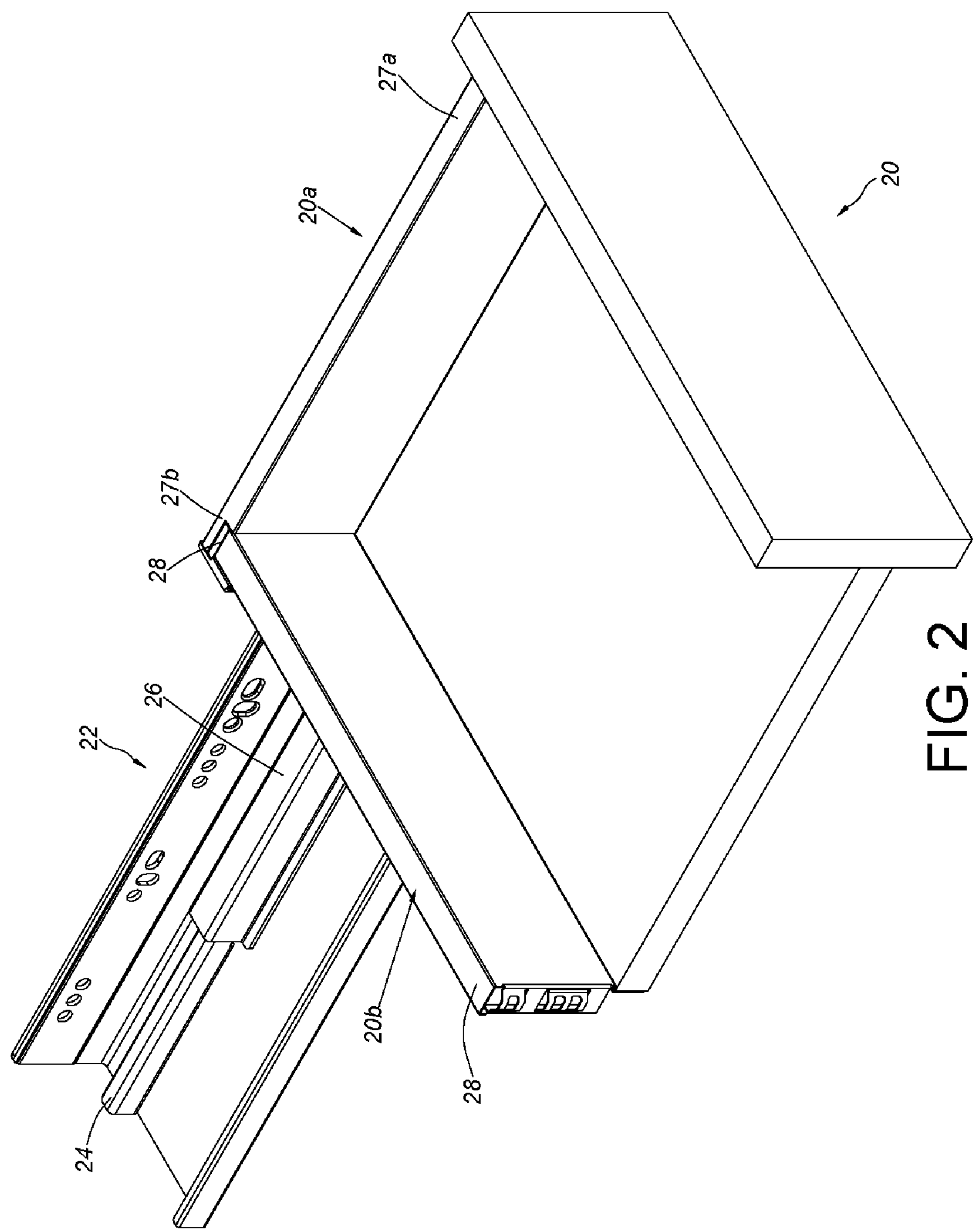
FIG. 2 is a three-dimensional diagram showing a slide rail of the slide rail assembly capable of carrying the furniture piece according to the embodiment of the present invention.

As shown in FIG. 2, each of the slide rail assemblies 22 includes a fixed rail 24 and a movable rail 26 longitudinally movable relative to the fixed rail 24. The furniture piece 20 includes a plurality of walls, such as a first wall **20*a* and a second wall 20*b*. The first wall 20*a* is carried by the movable rail 26, such that the furniture piece 20 can be moved along the movable rail 26 relative to the fixed rail 24 via the first wall 20*a*. In the embodiment, the first wall 20*a* is a side wall and is longitudinally arranged, the second wall 20*b* is a rear wall and is transversely arranged with respect to the first wall 20*a*, but the present invention is not limited thereto. The first wall 20*a* of the furniture piece 20 includes a first portion 27*a* and a second portion 27*b* opposite to the first portion 27*a*. The first portion 27*a* is a front portion, and the second portion 27*b* is a rear portion. Furthermore, the second wall 20*b* has two end portions opposite to each other. The phrase "longitudinally movable"/"longitudinally arranged" refers a member/feature is movable/arranged along a length direction of the fixed rail 24**.

Figure 3:
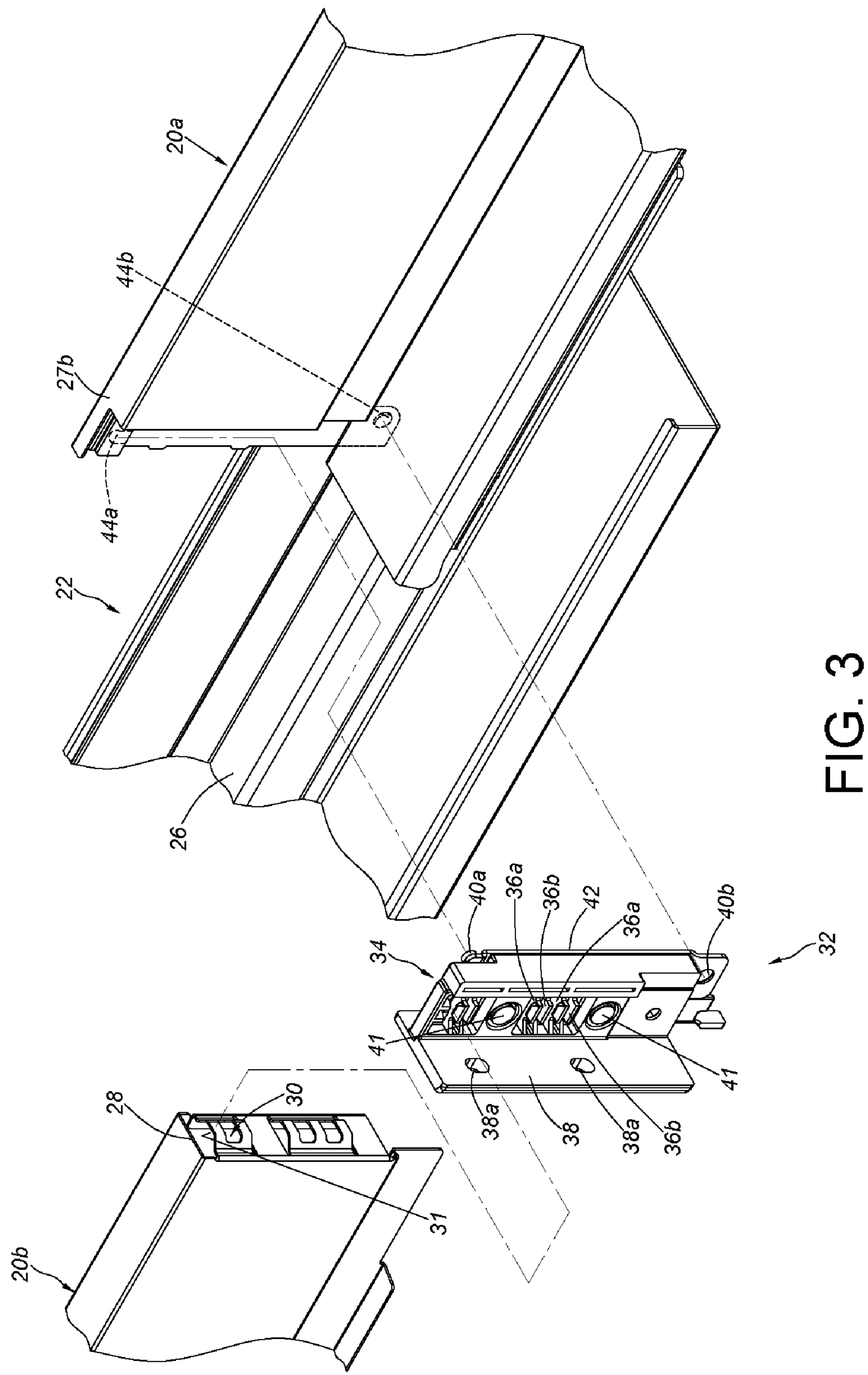
FIG. 3 is an exploded diagram showing a connecting device connecting a first wall to a second wall of the furniture piece mounted on the slide rail assembly according to the embodiment of the present invention.

As shown in FIG. 3, the second wall **20*b* is arranged with at least one mounting portion 30. Preferably, the at least one mounting portion 30 is arranged and adjacent to the end portion 28 of the second wall 20*b*. Preferably, the at least one mounting portion 30 protrudes from the end portion 28 of the second wall 20*b*. For example, the at least one mounting portion 30 is a protruding structure with curved contour. An accommodating space 31 is formed between an inner side of the protruding structure and the end portion 28 of the second wall 20*b*. At least one hole or slot communicating with the accommodating space 31 is formed at a middle portion of the protruding structure. The least one hole or slot has a width W. In the embodiment, a plurality of holes communicating with the accommodating space 31** are formed at the middle portion of the protruding structure, which is only for exemplary and the present invention is not limited thereto.

Furthermore, the present invention provides a connecting device 32 adapted to connect the first wall **20*a* and the second wall 20*b* of the furniture piece 20. Preferably, at least one portion of the connecting device 32 is made of a plastic material. In the embodiment, the connecting device 32** is made of a plastic material, but the present invention is not limited thereto.

Figure 4:
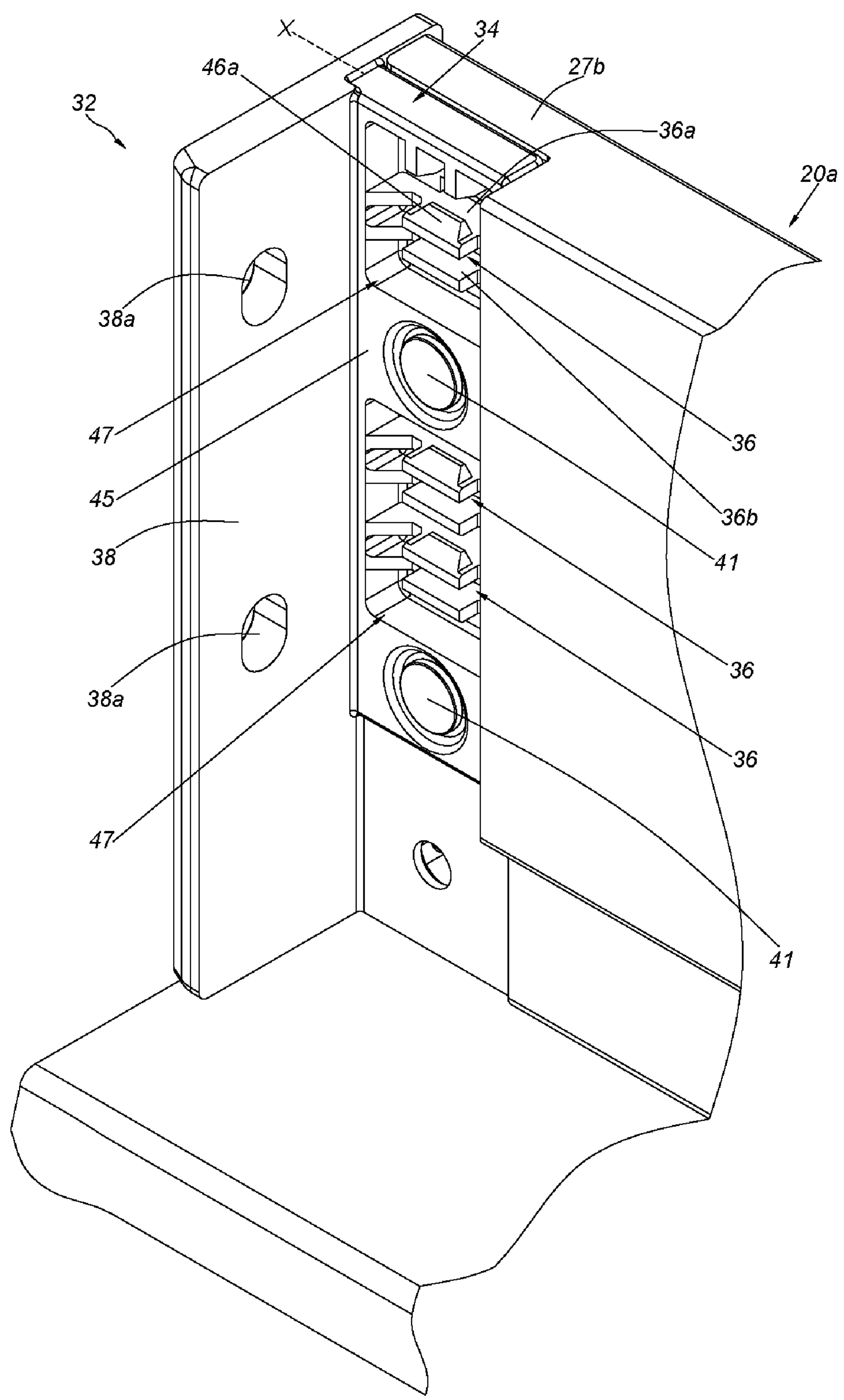
FIG. 4 is a diagram showing the connecting device connecting to the first wall of the furniture piece mounted on the slide rail assembly according to the embodiment of the present invention.

As shown in FIG. 3 and FIG. 4, the connecting device 32 includes a base portion 34 and at least one engaging arm 36. Preferably, the connecting device 32 further includes an auxiliary portion 38.

The base portion 34 is connected to the first wall **20*a* of the furniture piece 20. Preferably, the base portion 34 is connected and adjacent to the second portion 27*b* of the first wall 20*a* of the furniture piece 20. Specifically, the base portion 34 includes at least one connecting feature. In the embodiment, a first side (such as a rear side) of the base portion 34 is connected to (fixedly connected to or detachably connected to) the second portion 27*b*** of the first wall

20*a* of the furniture piece 20. For example, in the embodiment, the base portion 34 is connected to a plate 42 (shown in FIG. 3) via at least one fixing member 41 (such as screw or rivet), such that the plate 42 is attached to the first side of the base portion 34. The plate 42 includes at least one connecting feature, such as a first connecting feature 40*a* and a second connecting feature 40*b*, to be fixed to at least one corresponding feature of the first wall 20*a* of the furniture piece 20, such as a first corresponding feature 44*a* and a second corresponding feature 44*a* (shown in FIG. 3), via engaging, inserting or fastening. In other embodiment, the base portion 34 can be fixed to the first wall 20*a* of the furniture piece 20 via at least one screw or rivet. Therefore, the connection between the base portion 34 and the first wall 20*a* of the furniture piece 20 is not limited. Furthermore, the connecting features 40*a*, 40*b* and the corresponding feature 44*a*, 44*b* can be cooperated convex structures and concave structures, or cooperated convex structures and hole structures, and the present invention is not limited thereto. Furthermore, the number and the position of the connecting feature and the corresponding feature are only exemplary, and the present invention is not limited thereto.

The at least one engaging arm 36 is arranged at the base portion 34, and the at least one engaging arm 36 is substantially transversely arranged with respect to the first wall 20*a*. In the embodiment, the at least one engaging arm 36 is arranged at a second side (such as a front side) opposite to the first side of the base portion 34, which is only exemplary. The at least one engaging arm 36 is resiliently movable around a hypothetical axis X. The hypothetical axis X is substantially parallel to the first wall 20*a* which is longitudinally arranged.

Preferably, the at least one engaging arm 36 can be three pairs of engaging arms, which is only exemplary and the number of the engaging arm 36 is not limited thereto. Each pair of the engaging arms 36 includes a first engaging arm 36*a* and a second engaging arm 36*b*. The structures of the first engaging arm 36*a* and the second engaging arm 36*b* are substantially identical. The first engaging arm 36*a* and the second engaging arm 36*b* are separated from each other by a distance G. The distance G is less than the width W. Furthermore, each of the first engaging arm 36*a* and the second engaging arm 36*b* is arranged with an engaging portion. For example, the first engaging arm 36*a* is arranged with a first engaging portion 46*a*, and the second engaging arm 36*b* is arranged with a second engaging portion 46*b*. Preferably, the structures of the first engaging portion 46*a* and the second engaging portion 46*b* are configured to be symmetrical. Each of the first engaging portion 46*a* and the second engaging portion 46*b* includes a guiding segment 49. The guiding segment 49 can be arranged as an inclined surface or a curved surface. Furthermore, the first engaging portion 46*a* can be a hook facing upwardly, and the second engaging portion 46*b* can be a hook facing downwardly (shown in FIG. 5). However, the directions of the first engaging portion 46*a* and the second engaging portion 46*b* are not limited thereto.

Preferably, the base portion 34 includes a surface 45 and a space 47 adjacent to the surface 45. The surface 45 is substantially a plane. The space 47 is formed at the base 34, and an opening of the space 47 is located at the surface 45. The at least one engaging arm 36 is arranged inside the space 47, and a length of the at least one engaging arm 36 does not exceed the surface 45. Furthermore, the auxiliary portion 38 is substantially perpendicularly connected to the base portion 34, and the auxiliary portion 38 exceeds the surface 45 of the base portion 34 by a predetermined distance. The auxiliary portion 38 includes at least one fastening feature 38*a* to be inserted by a fastening member.

Figure 5:
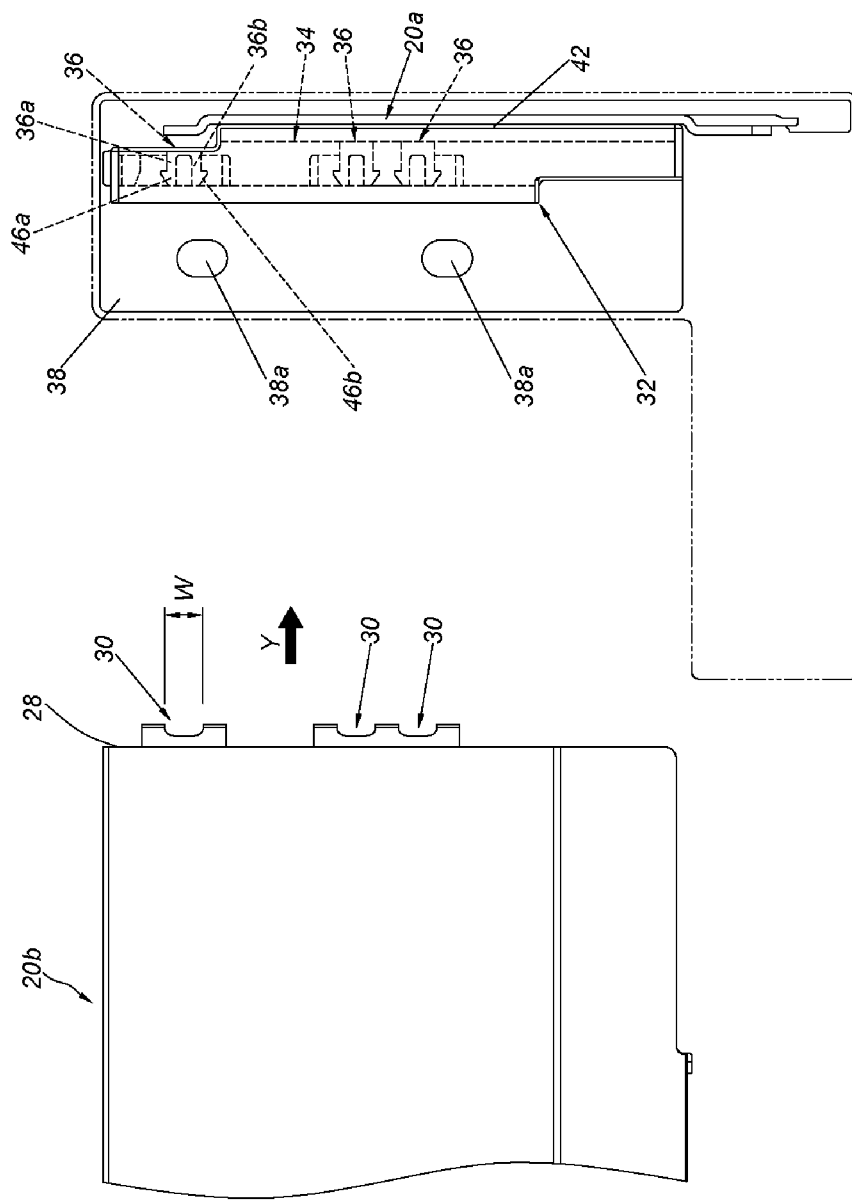
FIG. 5 is a diagram showing the second wall of the furniture piece mounting to the first wall of the furniture piece along a direction according to the embodiment of the present invention.

As shown in FIG. 5, the second wall 20*b* of the furniture piece 20 is mountable to the at least one engaging arm 36 along a mounting direction Y via the at least one mounting portion 30. The mounting direction Y is substantially perpendicular to the hypothetical axis X, and the mounting direction Y is substantially parallel to the at least one engaging arm 36 which is transversely arranged.

Figure 7:
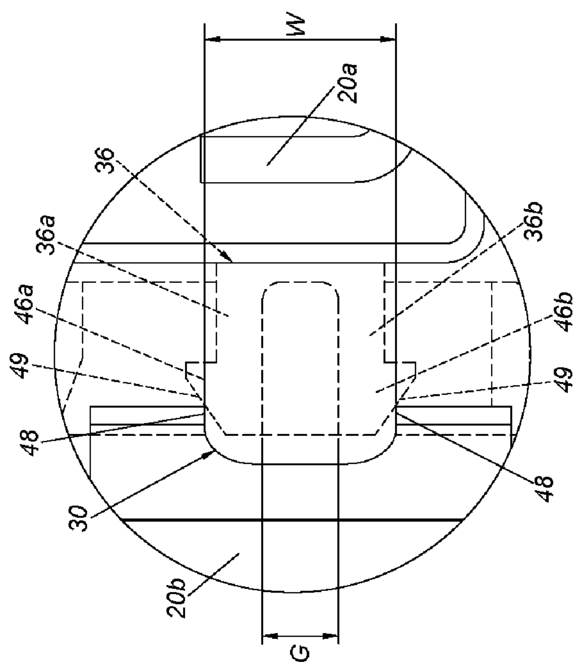
FIG. 7 is an enlarged view of a portion A of FIG. 6.
Figure 6:
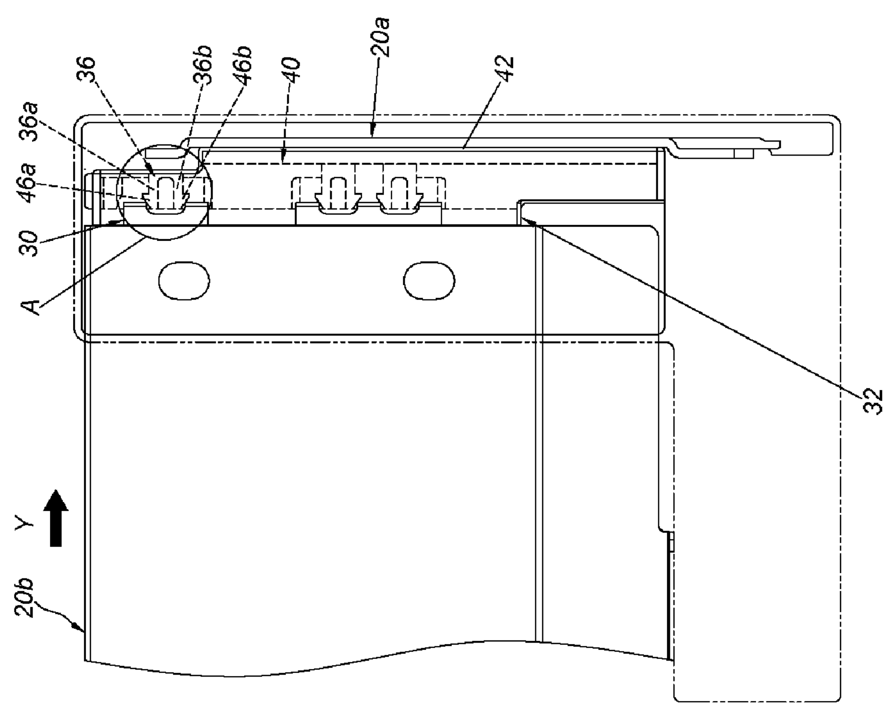
FIG. 6 is a diagram showing the second wall of the furniture piece continued to be moved toward the first wall of the furniture piece along the direction according to the embodiment of the present invention.

As shown in FIG. 6 and FIG. 7, when the second wall 20*b* of the furniture piece 20 is moved along the mounting direction Y to a predetermined distance and is close to the first wall 20*a*, the mounting end 48 of the at least one mounting portion 30 contacts the guiding segments 49 of the first engaging portion 46*a* and the second engaging portion 46*b* of the at least one engaging arm 36, wherein a distance between the two mounting ends 48 defines the width W.

Figure 9:
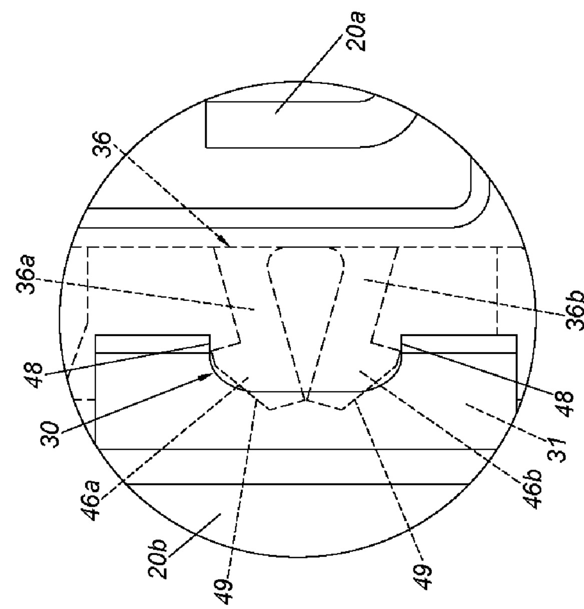
FIG. 9 is an enlarged view of a portion A of FIG. 8.
Figure 8:
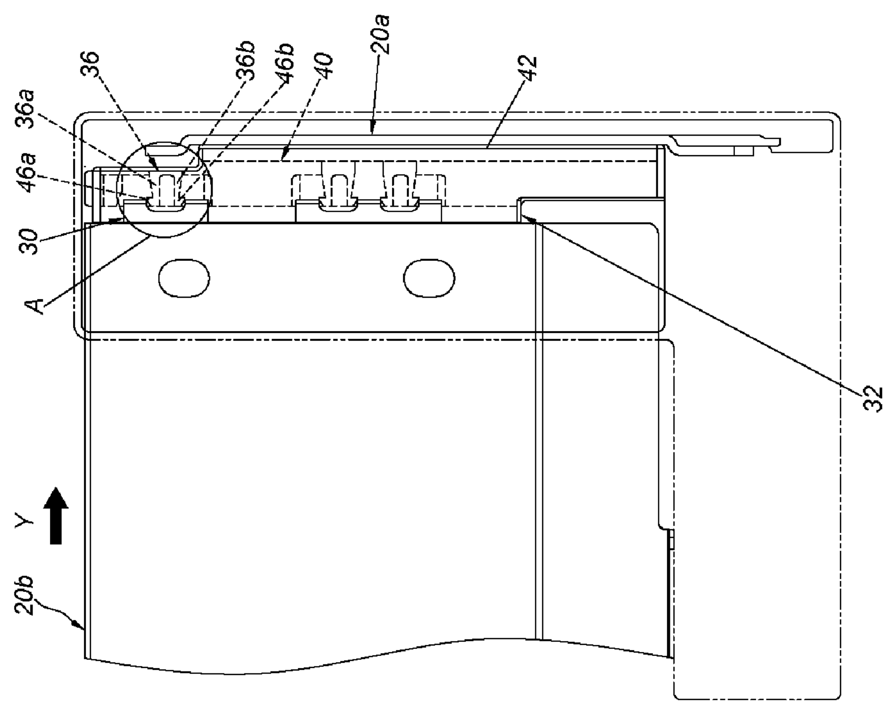
FIG. 8 is a diagram showing the second wall of the furniture piece further moved toward the first wall of the furniture piece along the direction according to the embodiment of the present invention.

As shown in FIG. 8 and FIG. 9, when the second wall 20*b* of the furniture piece 20 is continued to be moved along the mounting direction Y, the mounting end 48 of the at least one mounting portion 30 pushes against the guiding segments 49 of the first engaging portion 46*a* and the second engaging portion 46*b* of the at least one engaging arm 36 to drive the first engaging arm 36*a* and the second engaging arm 36*b* to move resiliently around the hypothetical axis X, such that the first engaging arm 36*a* and the second engaging arm 36*b* are approached toward each other. Meanwhile, the first engaging arm 36*a* and the second engaging arm 36*b* are in a state of accumulating a resilient force, and the end portions of the first engaging arm 36*a* and the second engaging arm 36*b* move slightly into the accommodating space 31.

Figure 11:
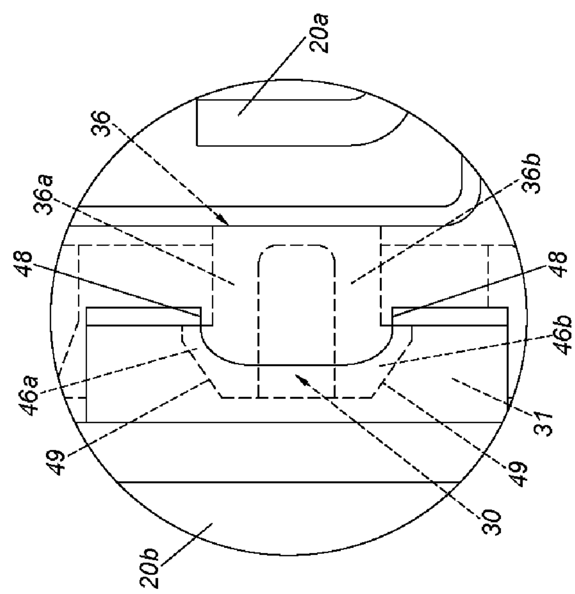
FIG. 11 is an enlarged view of a portion A of FIG. 10.
Figure 10:
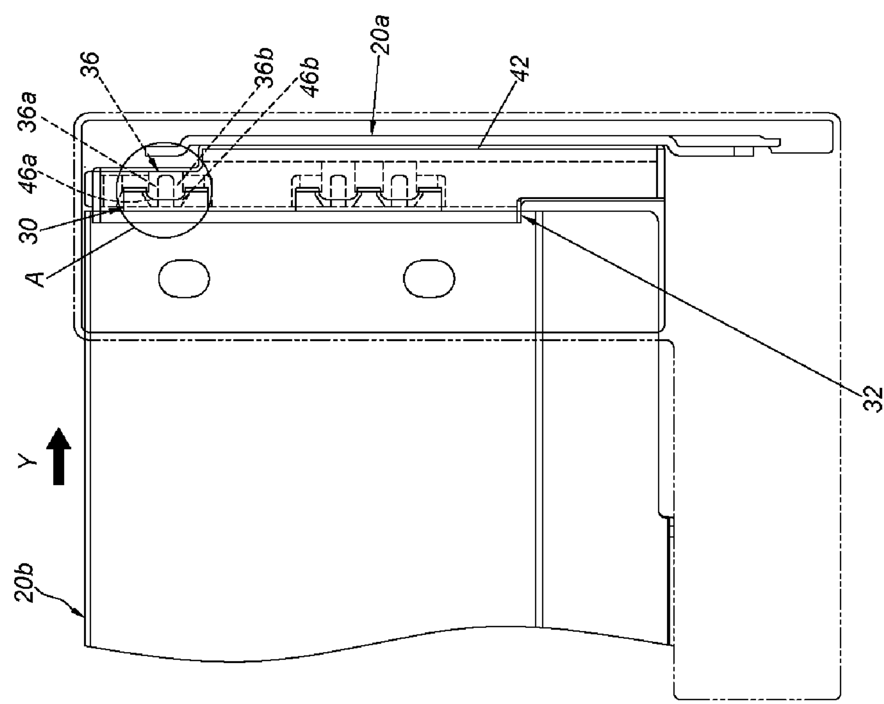
FIG. 10 is a diagram showing the second wall of the furniture piece being connected to the first wall via the connecting device according to the embodiment of the present invention.

As shown in FIG. 10 and FIG. 11, when the second wall 20*b* of the furniture piece 20 is further moved along the mounting direction Y, the mounting end 48 of the at least one mounting portion 30 further passes the first engaging portion 46*a* and the second engaging portion 46*b* of the at least one the engaging arm 36, such that the first engaging portion 46*a* and the second engaging portion 46*b* of the at least one engaging arm 36 are accommodated in the accommodating space 31. Once the mounting end 48 of the at least one mounting portion 30 passes the first engaging portion 46*a* and the second engaging portion 46*b*, the first engaging arm 36*a* and the second engaging arm 36*b* release the resilient force, such that the first engaging arm 36*a* and the second engaging arm 36*b* return to the state that the first engaging arm 36*a* and the second engaging arm 36*b* are spaced by the distance G. As such, the first engaging portion 46*a* and the second engaging portion 46*b* engage with the mounting end 48 of the at least one mounting portion 30 and abut against a wall surface of the mounting end 48 of the at least one mounting portion 30. Therefore, the second wall 20*b* can be fixedly connected to the first wall 20*a* via the connecting device 32 in a tool-free manner.

Moreover, the at least one mounting portion 30 of the connecting device 32 can be detachably disengaged from the first engaging portion 46*a* and the second engaging portion 46*b*. For example, when a user applies a force to deform the first engaging arm 36*a* and the second engaging arm 36*b* (as the state shown in FIG. 9), the first engaging portion 46*a* and the second engaging portion 46*b* are no longer engaged with the mounting end 48 of the at least one mounting portion 30, such that the second wall 20*b* can be detached from the first wall 20*a* along a detaching direction opposite to the mounting direction Y.

Figure 12:
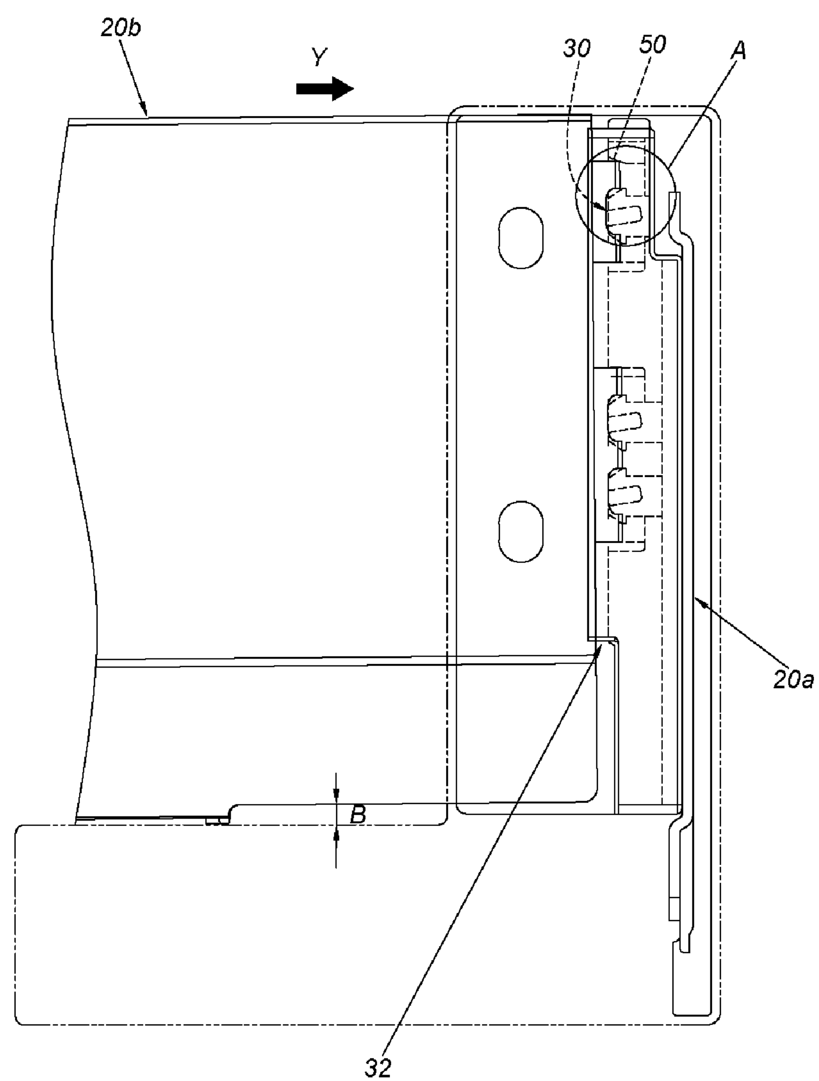
FIG. 12 is a diagram showing a mounting error between the first wall and the second wall of the furniture piece according to the embodiment of the present invention.
Figure 13:
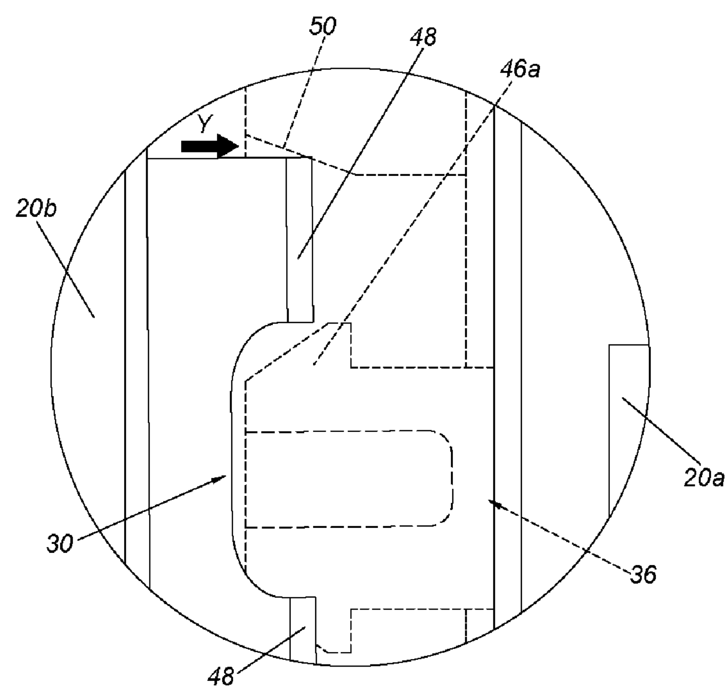
FIG. 13 is an enlarged view of a portion A of FIG. 12.

As shown in FIG. 12 and FIG. 13, the connecting device 32 can further include a guiding portion 50, and the guiding portion 50 can be a curved surface or an inclined surface.

Figure 14:
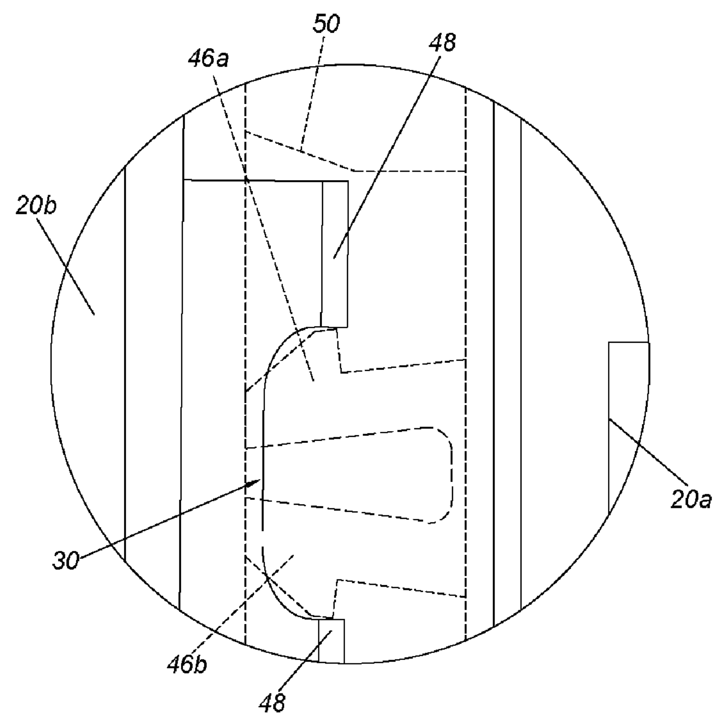
FIG. 14 is a diagram showing the mounting error between the first wall and the second wall of the furniture piece capable of being guided and corrected by a guiding portion of the connecting device according to the embodiment of the present invention.

When the second wall 20_b_ of the furniture piece 20 has a mounting error B with respect to the first wall 20_a_, the second wall 20_b_ of the furniture piece 20 can be guided and corrected by the guiding portion 50 (as shown in FIG. 14), which can facilitate the at least one mounting portion 30 to be mounted to the engaging portion (such as the first engaging portion 46_a_ and the second engaging portion 46_b_) of the engaging arm 36 (as shown in FIG. 11).

For example, during the second wall 20_b_ of the furniture piece 20 being moved toward the first wall 20_a_ along the mounting direction Y, if the second wall 20_b_ of the furniture piece 20 has the mounting error B with respect to the first wall 20_a_ (as shown in FIG. 12), with the mounting end 48 of the mounting portion 30 contacting the guiding portion 50 (as shown in FIG. 13), the second wall 20_b_ of the furniture piece 20 can be guided and corrected (as shown in FIG. 14). As such, the mounting end 48 of the at least one mounting portion 30 can be successfully engaged to the first engaging portion 46_a_ and the second engaging portion 46_b_ (as shown in FIG. 11).

Figure 15:
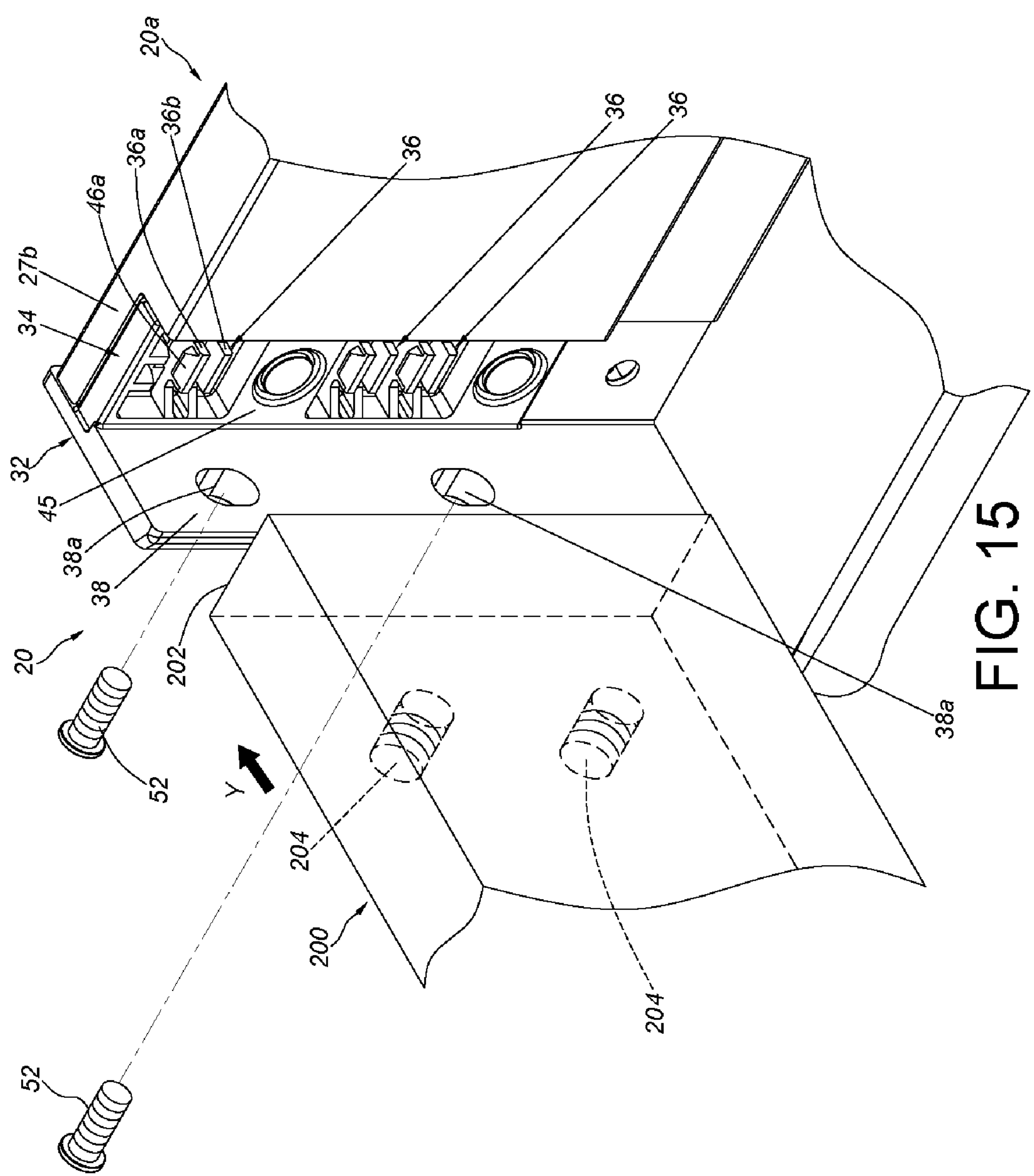
FIG. 15 is a diagram showing another second wall of the furniture piece capable of being mounted to the first wall via the connecting device according to another embodiment of the present invention.
Figure 17:
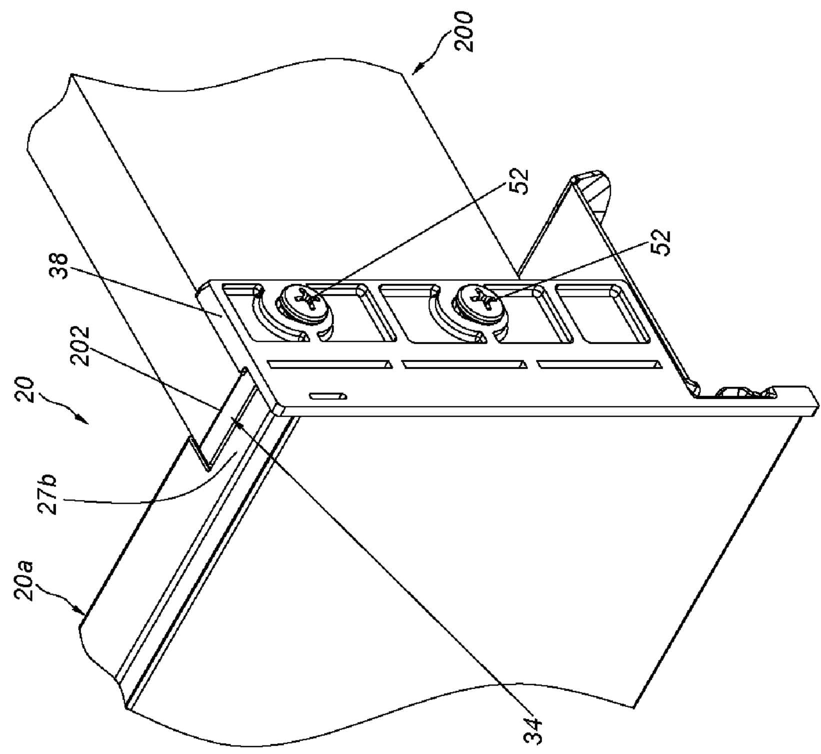
FIG. 17 is a diagram showing the another second wall of the furniture piece which has been mounted to the first wall at another view angle according to the another embodiment of the present invention.
Figure 16:
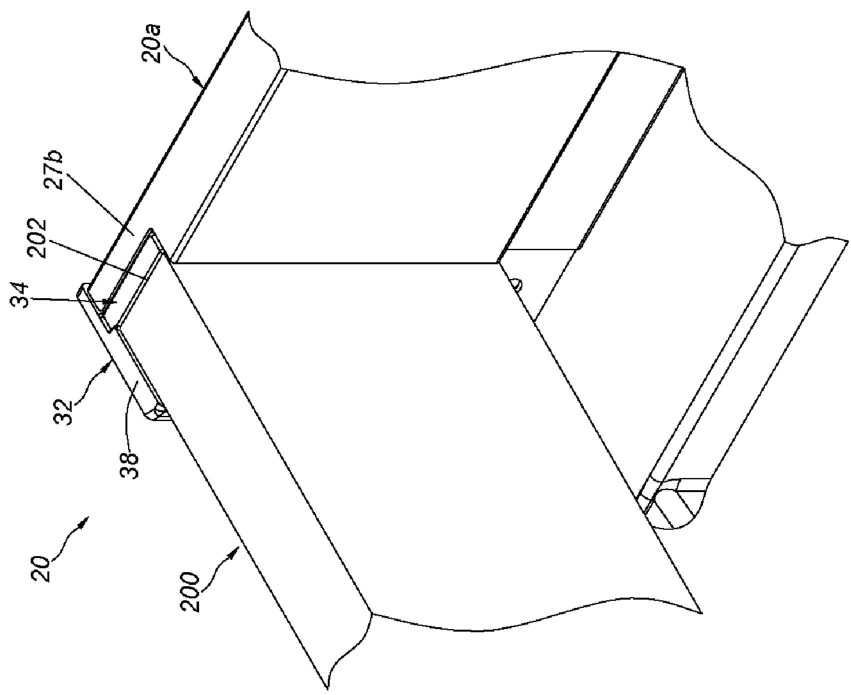
FIG. 16 is a diagram showing the another second wall of the furniture piece which has been mounted to the first wall at a view angle according to the another embodiment of the present invention.

As shown in FIG. 15, FIG. 16 and FIG. 17, when the second wall 20_b_ of the furniture piece 20 is detached from the first engaging portion 46_a_ and the second engaging portion 46_b_ via the mounting portion 30, another type of plate (such as a wood plate or other solid plate) can be used to replace the second wall 20_b_. For example, an end 202 of the another second wall 200 used in the furniture piece 20 is capable of abutting against the surface 45 of the base portion 34 of the connecting device 32, at least one fastening feature 38_a_ is provided to be inserted by the at least one fastening member 52 and the fastening member 52 is fastened to at least one corresponding fastening feature 204 of the another second wall 200, such that the another second wall 200 is fixed to the auxiliary portion 38, and the another second wall 200 can be connected to the first wall 20_a_ thereby.

Therefore, the connecting device 32 is capable of connecting two types of second walls (for example, the aforesaid second wall 20_b_ and the another second wall 200) with different structures to the first wall 20_a_ without using other accessories, which can satisfy different market demands.

To sum up, the connecting device 32 according to the embodiment of the present invention includes features as follows.

First, the second wall 20_b_ of the furniture piece 20 can be connected to the first wall 20_a_ in a tool-free manner, which facilitates and eases the assembling and detachment.

Second, the at least one engaging arm 36 is substantially transversely arranged with respect to the first wall 20_a_ which is longitudinally arranged, and the mounting direction Y of the second wall 20_b_ is substantially parallel to the engaging arm 36 which is substantially transversely arranged. As such, it facilitates a user to connect the second wall 20_b_ to the first wall 20_a_.

Third, the connecting device 32 is capable of connecting two types of second walls (20_b_ and 200, shown in FIG. 3 and FIG. 0.15) with different structures to the first wall 20_a_ without using other accessories, which can satisfy different market demands.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A connecting device connected to a first wall of a furniture piece and selectively mounting a second wall or a third wall to the first wall of the furniture piece, the first wall being longitudinally arranged, the connecting device comprising:

a base portion connected to the first wall of the furniture piece, the base portion comprising a surface and a space adjacent to the surface, the space being concaved from the surface;

at least one engaging arm arranged inside the space of the base portion, the at least one engaging arm being substantially transversely arranged with respect to the first wall, the at least one engaging arm being arranged with an engaging portion, and the at least one engaging arm not exceeding the surface; and an auxiliary portion with at least one fastening feature unmovable relative to the base portion, the auxiliary portion being substantially perpendicularly connected to the base portion, the auxiliary portion exceeding the surface of the base portion by a predetermined distance;

wherein a mounting portion of the second wall of the furniture piece is detachably mounted to the engaging portion when the second wall is connected to the first wall with the connecting device;

wherein the third wall is capable of connecting to the first wall through the connecting device when the second wall is not connected to the connecting device, when the third wall is connected to the first wall with the connecting device, an end of the third wall of the furniture piece abuts against the surface of the base portion without interference with the engaging portion of the at least one engaging arm, leading the at least one fastening feature of the auxiliary portion to correspond to at least one corresponding fastening feature of the third wall, such that a fastening member is fastened to the at least one corresponding fastening feature of the third wall via the at least one fastening feature of the auxiliary portion.

2. The connecting device of claim 1, wherein at least one portion of the connecting device is made of a plastic material.

3. The connecting device of claim 1, wherein the base portion is fixed to the first wall of the furniture piece via at least one connecting feature.

4. The connecting device of claim 1, wherein the first wall of the furniture piece comprises a first portion and a second portion opposite to the first portion, and the base portion is connected and adjacent to the second portion.

5. The connecting device of claim 1, further comprising a guiding portion, the guiding portion being a curved surface or an inclined surface, wherein when the second wall of the furniture piece has a mounting error with respect to the first wall of the furniture piece, the second wall of the furniture piece is guided and corrected by the guiding portion, so as to facilitate the mounting portion to be mounted to the engaging portion.

6. The connecting device of claim 1, wherein the mounting portion is arranged and adjacent to an end portion of the second wall.

7. The connecting device of claim 6, wherein the mounting portion is a hole, when the mounting portion is mounted to the engaging portion, the engaging portion passes through the hole and is engaged at a mounting end of the hole.

8. The connecting device of claim 1, wherein the surface is substantially a plane.

9. The connecting device of claim 1, wherein the mounting portion protrudes from the end portion of the second wall, and an accommodating space is formed between the mounting portion and the end portion of the second wall to accommodate the engaging portion.

10. The connecting device of claim 1, wherein a continuously wall surrounds the space, a height of the continuously wall is constant, the at least one engaging arm arranged inside the space is connected to a bottom of the space, a length of the at least one engaging arm does not exceed the height of the continuously wall, such that the at least one engaging arm does not exceed the surface.

* * * * *